United States Patent [19]

Boen et al.

[11] 4,244,720
[45] Jan. 13, 1981

[54] FIBER WASTE AND CULLET COLLECTION PROCESS AND APPARATUS THEREFOR

[75] Inventors: Howard E. Boen, Waukegan, Ill.; Andre R. de Muinck, Littleton, Colo.; John H. Miller, Littleton, Colo.; Samuel R. Genson, Littleton, Colo.

[73] Assignee: Johns-Manville Corporation, Denver, Colo.

[21] Appl. No.: 958,866

[22] Filed: Nov. 8, 1978

[51] Int. Cl.³ ............................................. C03B 37/04
[52] U.S. Cl. ................................................. 65/8; 65/2; 65/10; 65/15; 65/29; 264/8; 425/135; 425/145
[58] Field of Search .................... 65/2, 8, 10, 15, 29, 65/19, 20, 141; 264/5, 8, 14; 425/135, 145

[56] References Cited

U.S. PATENT DOCUMENTS

| | | | |
|---|---|---|---|
| 1,076,657 | 10/1913 | Schol | 65/20 |
| 1,115,321 | 10/1914 | Lessing | 65/141 X |
| 3,222,151 | 12/1965 | Schreffler | 65/29 |
| 3,539,316 | 11/1970 | Trethewey | 65/29 X |
| 3,647,405 | 3/1972 | Smith | 65/19 |
| 3,938,976 | 2/1976 | Walker | 65/29 |

FOREIGN PATENT DOCUMENTS 652954   11/1937   Fed. Rep. of Germany .............. 65/20

*Primary Examiner*—Robert L. Lindsay, Jr.
*Attorney, Agent, or Firm*—Robert M. Krone; Joseph J. Kelly; James W. McClain

[57] ABSTRACT

A process and apparatus therefor are described for reclaiming waste material from a fiberizing system and for converting a molten stream of material into reclaimable cullet when the system is not fiberizing. When the system is fiberizing the waste is collected in a dry environment and continually conveyed away; when the system is not fiberizing the molten stream is reduced to cullet and collected in a wet environment and continually conveyed away; and when fiberizing is resumed there is a return to the collection of waste in a dry environment.

27 Claims, 5 Drawing Figures

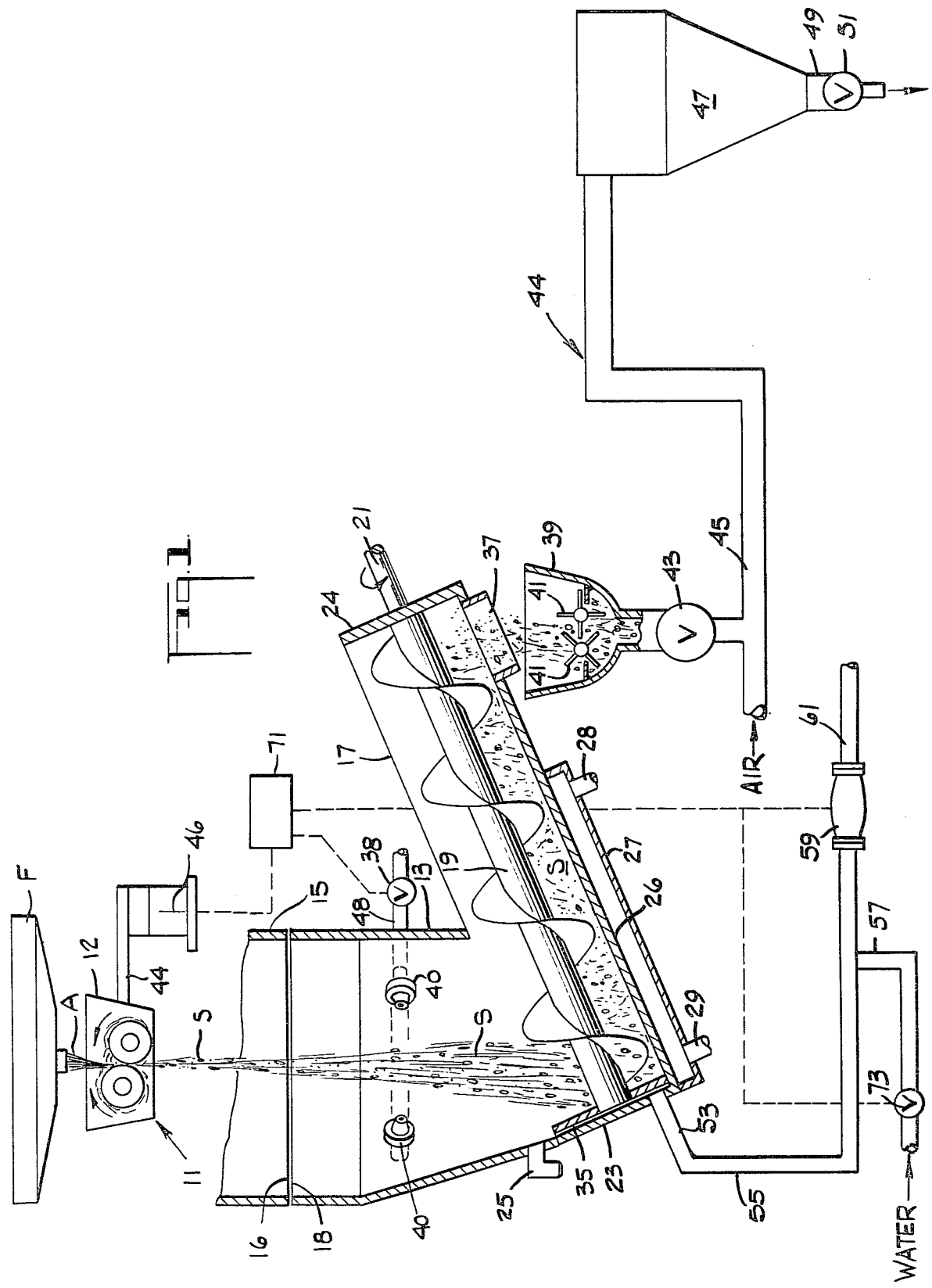

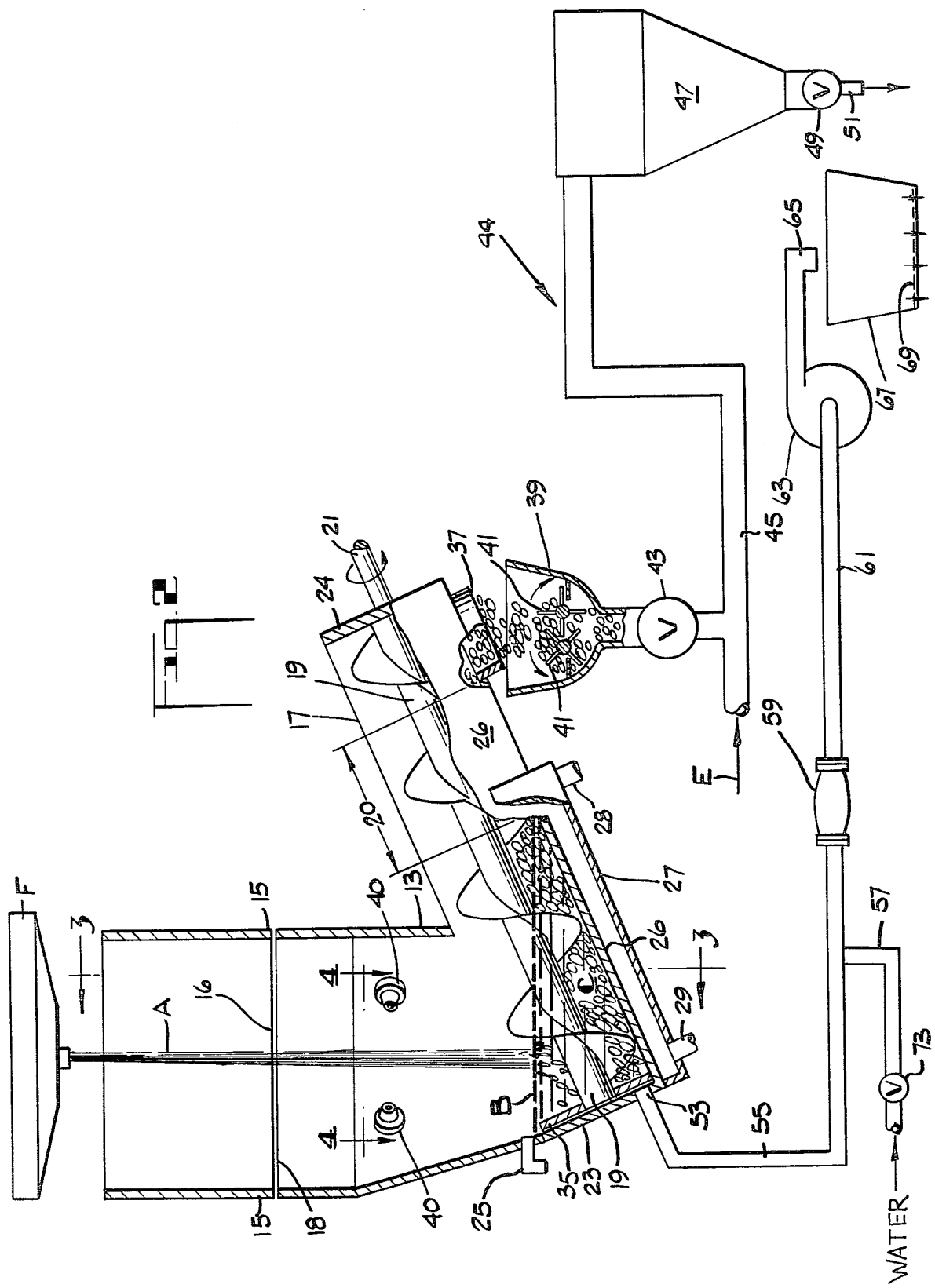

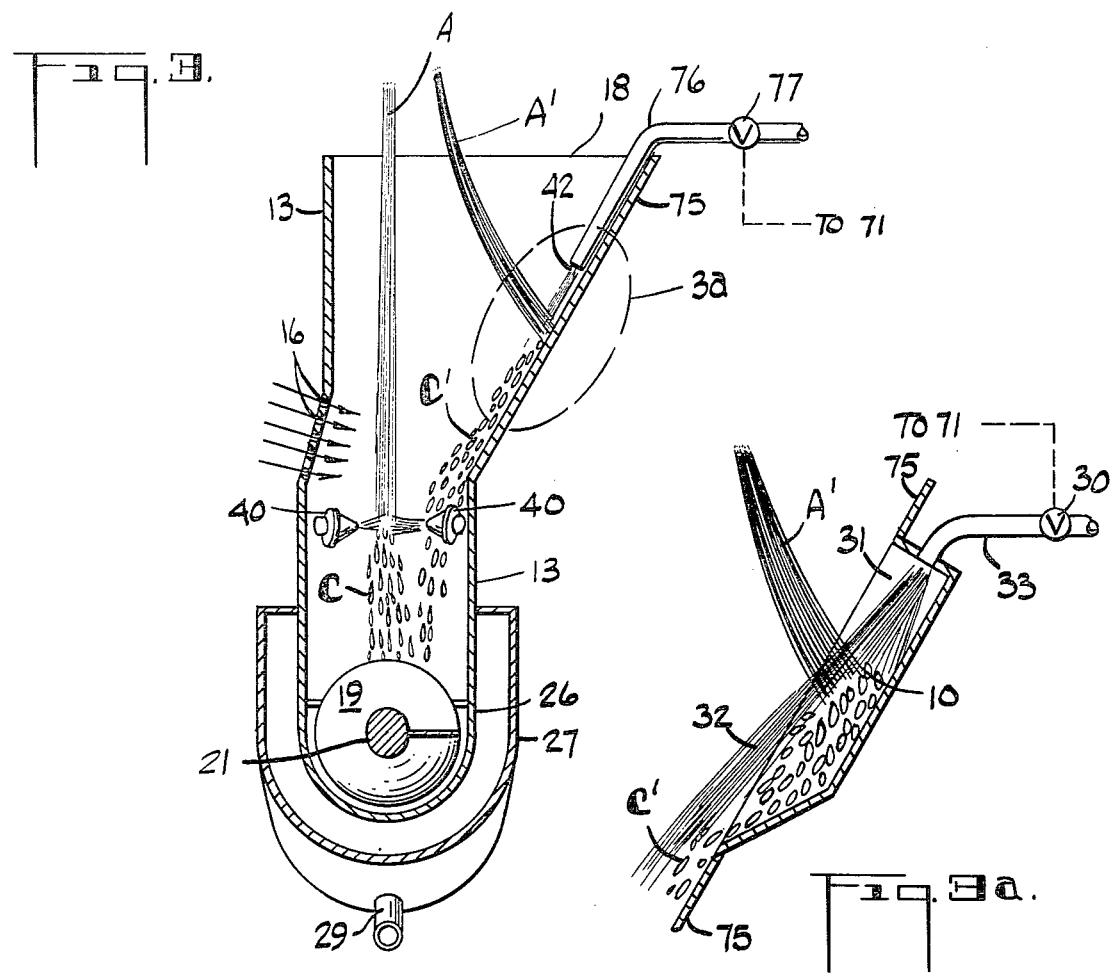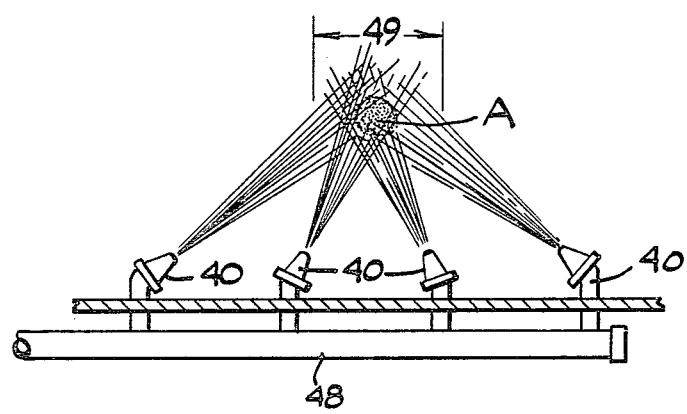

FIBER WASTE AND CULLET COLLECTION PROCESS AND APPARATUS THEREFOR

TECHNICAL FIELD

The invention herein relates to processes for the formation of fibers from molten raw materials.

BACKGROUND OF PRIOR ART

Refractory fibers (of predominately aluminosilicate composition), mineral wool fibers and other kinds of fibers are commonly manufactured by impinging a molten stream of the fiber forming materials on spinners or rotors which are rotating at high speed, see, e.g., U.S. Pat. Nos. 2,388,935; 2,428,810; 2,520,168; 2,520,169; 2,561,843; 2,632,919 and 3,159,475. (For convenience the discussions below will be in terms of inorganic, e.g. refractory, fibers. However, as will be noted, the invention may also be applicable to some organic fibers.) The high surface speed of the rapidly spinning rotors breaks up the molten stream into small drops and throws these drops at high velocity from the rim of the rotors. Since the drops are still molten they rapidly attenuate into fine filaments or fibers. These drops, however, also cool rapidly so that usually a portion of each drop solidifies before the drop can be completely attenuated. This solidified nonfibrous material is known as "shot" and is considered very undesirable in the collected fiber, for it gives the resulting fiber body a gritty feel and also reduces the thermal resistance of the body. Some of the larger shot particles break free from the fibers by themselves. In addition, a number of techniques have been developed to separate shot from fiber so that the latter can be separately collected; see, e.g., U.S. Pat. Nos. 2,968,069; 2,991,499 and 3,142,869. In addition to the separated shot, "waste" collected will also include coarse fibers and even some fine fibers which are carried away from the main fiber stream with the shot and coarse fiber during shot separation. Conventional practice in the past has been to allow the waste to drop into a dry collection hopper positioned below the level of the fiberizing rotors and within the fiberizing unit enclosure. When the hopper has become filled with waste, it is necessary to open the unit enclosure and remove the filled hopper (usually using a forklift truck) and replace it with an empty hopper. This procedure has several disadvantages: (1) opening of the fiberizing unit enclosure seriously disrupts the air flow through the fiber collection region and causes undesirable variations in the fiber product being collected; (2) the waste hoppers fill relatively rapidly and therefore must be replaced frequently, thus requiring a significant amount of a workman's time; (3) since the hoppers must be exchanged while the unit continues to run, the workman doing the exchanging is constantly exposed to a rain of hot shot granules falling from the rotors above the hopper location. In addition, since the waste collected contains significant quantities of fibers, it is not directly suitable for recycle and remelting.

During the course of operation of the fiberizing unit it is often necessary to remove the rotors temporarily from their position directly below the melt stream. Such an occasion may occur, for instance, when the rotors must be repaired, when there is a breakdown at the fiber collection end of the production unit or when one set of rotors is to be replaced by another. While the rotors are out of position, the melt stream pours directly down into the waste collection hopper, a procedure commonly referred to as "slagging off." Normally when slagging off is occurring the waste collection hopper is at least partially filled with water so that the molten material will solidify and break up into pieces. The cooled and broken material ("cullet") frequently contains large lumps or pieces which cannot be readily reclaimed in a form suitable for remelting.

The wet cullet collection hopper must also be changed periodically if slagging off continues for prolonged time. The much larger and hotter quantity of material involved and the amount of water present make changing the wet cullet collection hoppers a more dangerous procedure than changing the dry waste hoppers. Additionally, once the rotors are replaced in position and fiberization resumes, it is necessary to replace the wet cullet collection hopper with the dry waste collection hopper.

From the above it will be apparent that it would be desirable to have a collection system which would have a number of features: (1) it could be operated dry to collect waste; (2) it could be rapidly converted to a wet system to collect cullet; (3) it could be operated in a manner such that the waste and cullet collected would be usable as or suitable for conversion to "reclaim," the form of scrap which is suitable for remelting; (4) it could be operated such that material collected could be continuously removed from the collection area and conveyed to a second collection point located away from the fiberization unit, so that frequent replacement of collection hoppers would be unnecessary, workmen would not be exposed to either hot shot or hot cullet, and the fiberization unit enclosure would not have to be repeatedly opened and closed with the attendant disruption of the fiber collection process; and (5) the operation could be automatically controlled such that the unit could respond to either shot formation conditions or slagging off conditions. To achieve these ends are objects of the present invention.

BRIEF SUMMARY OF INVENTION

The present invention comprises a process for the collection of waste or cullet from a fiberizing system in which a melt stream impinges on the outer rim of at least one rapidly spinning rotor, is broken into small drops by such impingement and the drops are attenuated into fibers by being flung from the rim of said at least one rotor, which process comprises: (a) positioning a collection hopper below the level of said at least one rotor in said system and disposed to receive waste or cullet from said system; (b) providing means to sense whether fiberizing is or is not occurring in said system at a given point in time; (c) when fiberizing is occurring, collecting waste from said fiberizing in said hopper while said hopper is substantially dry; (d) when fiberizing is not occurring, collecting cullet from said system in said hopper while there is a significant quantity of water in said hopper in contact with the melt stream whereby said cullet is formed; and (e) providing means responsive to said sensing means to cause said quantity of water to be introduced into said hopper when the non-occurrence of fiberizing is sensed and to cause said hopper to be substantially drained of water when the occurrence of fiberizing is sensed. Preferably the process also comprises continuous conveying of the waste or cullet away from the hopper, preferably followed by recycling the conveyed waste or cullet back to the fiberization system with or without further processing.

The invention also comprises apparatus for the collection of waste or cullet from a fiberization system in which a melt stream impinges on the outer rim of at least one rapidly spinning rotor, is broken into small drops by such impingement and the drops are attenuated into fibers by being flung from the rim of said at least one rotor, which apparatus comprises: (a) a hopper disposed below the level of said at least one rotor in said system and positioned to collect waste or cullet from the system; (b) sensing means to sense whether fiberization is or is not occurring in said system; (c) flooding means to introduce a significant amount of water into said hopper in a manner such that said water will contact the melt stream from which said cullet is formed; (d) draining means to drain said hopper substantially free of water; and (e) means responsive to said sensing means to operate said flooding means when fiberization is not occurring and to operate said draining means when fiberization is occurring. The apparatus preferably also comprises conveying means to continuously convey said collected waste or cullet away from said hopper. In addition the apparatus may also contain comminuting means to break up collected waste or cullet into particles of a size satisfactory for air conveying and/or remelting.

BRIEF DESCRIPTION OF DRAWINGS

FIG. 1 is a schematic side view illustrating collection of shot and other waste material according to the invention during fiberizing operations.

FIG. 2 is a schematic side view illustrating the converting of a molten stream of material into cullet and collection of the cullet according to the invention during slagging off operations.

FIG. 3 is a cross-sectional view taken on line 3—3 of FIG. 2 and illustrates two alternative embodiments of the cullet collection process.

FIG. 3a is a fragmentary view of the area designated 3a in FIG. 3, and illustrates another alternative embodiment of the cullet collection process.

FIG. 4 is a plan view taken on line 4—4 in FIG. 3 and illustrates nozzle operation.

DETAILED DESCRIPTION OF INVENTION

The invention herein will be described first in terms of the embodiment associated with the fiberization operation, which is the operation underway during most of the time that the unit is running. FIG. 1 shows a conventional pair of rotors 11 upon which is impinging a molten stream A of fiber forming material. (A pair of rotors 11 is shown in the drawing. It will be apparent from the aforementioned U.S. patents, however, that the number and configuration of the rotors can be varied; see U.S. Pat. Nos. 2,388,935 el at.) The rotors 11 are driven by conventional motors (not shown) at speeds of several thousand rpm with both motors mounted on a support unit 12. Rotor support unit 12 is in turn supported by arm 44 which is attached to pivot 46. The rotor unit 12 can thus be swung readily into and out of position below the melt stream A which is flowing from furnace F. In the view shown in the drawing there is conventionally a fan, blower, steam jet or gas jet (not shown) mounted directly behind rotor unit 12 so that the material flung from the spinning rotor surfaces is attenuated by being blown out of the plane of the drawing in the direction of the viewer of the drawing. Simultaneously a large quantity of waste S (comprising a mixture of large and small shot particles and both coarse and fine fibers of various lengths) is formed and falls generally downward from the rotors 11. The waste S falls through the opening 16 at the bottom of shot hood 15 (which is at least part of the lower portion of the fiberization unit enclosure). Positioned directly below the opening 16 and dimensioned so as to collect essentially all of the falling waste S is hopper 13 having at the top thereof opening 18. Conveniently, the openings 16 and 18 are of substantially equal size to assure virtually complete waste capture. The waste S falling into hopper 13 is deposited at the bottom thereof adjacent to lower wall 23 and bottom 26.

The apparatus also contains means for removing the waste or cullet from the hopper. Preferably such means operates continuously and is in the form of screw conveyor 19. Because of the coarse and abrasive nature of the waste and cullet, the screw conveyor 19 used is preferably of the type known as a "gravel washer," which is of heavy duty construction. In a preferred embodiment the screw conveyor 19 has an 18" diameter and an 18" pitch and is made of abrasion resistant metal. Such a conveyor can be driven through screw shaft 21 by a motor having 1 to 10 hp. through a conventional gear reducer (both not shown) at a constant speed of about 10 rpm. Higher rotational speeds tend to cause the screw (especially with wet cullet within water body B; see FIG. 2) to act as a mixer rather than a conveyor. The waste or cullet collects at one end (the lower end) of the conveyor 19, which is mounted for rotation preferably in anti-grit flush-type bearings on lower wall 23. In the embodiment shown it is canted upward at an angle of about 23° from the horizontal and at its upper end is journaled through bearings on the upper wall 24 of extension 17 of hopper 13. The upward inclination of screw conveyor 19 is not critical for the dry waste collection operation but is important in the wet cullet operation to be described below.

The collected waste S travels upward by means of screw conveyor 19 and is discharged through opening 37 and through de-lumper 39. De-lumper 39 has therein counter-rotating blades 41 which as they turn serve to reduce the fibers in the waste to a particle size that is compatible with conveyance in the air conveying system 44 and/or with recycling, as desired. The de-lumper 39 also serves to break up an agglomerations of shot (or cullet) which may form. A rotary valve 43 passes waste from the de-lumper 39 into the air conveying line 45 which connects to cyclone 47. Material that is separated from the conveying air E may pass through rotary valve 49 and exit from the cyclone at 51 to further conventional storage or collection means (not shown) and from which the material may ultimately be recycled when desired back to furnace F for remelting, with or without further processing (as will be discussed below). Material exiting from de-lumper 39 may also be conveyed by means other than air conveyance, as for instance by a moving conveyor belt or a gravity chute leading to the further storage or collection means.

FIGS. 2, 3, 3a, and 4 show embodiments of the wet cullet collection process. In this process the apparatus is the same as that shown in FIG. 1, with the exceptions noted below. In one embodiment (FIG. 2) the hopper 13 is at least partially filled with a body B of liquid (normally water), whose depth and surface position are determined by the position of overflow 25. The melt stream falls directly into this water where it breaks up into cullet pieces C by thermal shock. These pieces C settle to the bottom of the water mass B where they are completely solidified by the cooling action of the water. Screw conveyor 19 then carries upwardly and out of the water. In de-lumper 39 any cullet agglomerations are broken into small size particles which are then fed through the air recycle system 44 in the manner as described above for the waste recycle. It is important in the wet cullet operation that there be an extension 17 of the hopper 13 as well as an inclination to the screw conveyor 19 so that there will be a dewatering section 20 between the top surface of the water body B and the opening 37. The wet cullet is moved through this section 20 to permit drainage of free water from the cullet, so that large quantities of water will not be taken into the subsequent particle conveying system. Inclination of screw conveyor 19 may be on the order of 10° to 45° or greater, although at the higher inclinations (above about 30°) the greater mass of cullet in each flight of the screw tends to retain water so dewatering is less effective. At the lower elevations (below about 20°) the length of extension 17 becomes unduly long. Within the resulting preferred inclination of 20° to 30°, it has been found most preferable to have an inclination (as noted above) of about 23° from the horizontal. This provides good dewatering as well as a reasonable length for extension 17. Whatever moisture may remain on the surface of the cullet can be removed by driers in the conventional collection and storage system following hopper 47. Similarly, and as desired, further milling of the waste and/or cullet with other comminuting means can be accomplished to reduce it to the reclaim particle size desired for recycling to furnace F. Such operations of drying and comminuting are conventional and need not be further described here.

In another embodiment (FIG. 3) no body B of water need accumulate in the hopper 13. However, a large quantity of water is introduced into hopper 13 through nozzles 40 and impinges directly on the melt stream A, as shown in FIG. 4. The nozzles 40 are supplied with water through line 48 which contains valve 38. The nozzles 40 are arrayed and directed so that a water filled zone 49 somewhat wider than melt stream A is created, to allow for the tendency of melt stream A to waiver slightly from the vertical as it falls downward into hopper 13. The water causes melt stream A to break up into cullet C which then falls to the bottom of hopper 13 and is conveyed away by screw conveyor 19 as described above. The water from nozzles 40 can either accumulated as water body B or, preferably, is continually drained from hopper 13 through discharge opening 53, which is at the bottom of the lower end of wall 23. Opening 53 also serves to drain the hopper 13 of water body B. A circular fine particle screen 35 is attached to the lower end of screw 19 and turns therewith. Screen 35 screens out much of the waste and cullet from water which discharges through opening 53.

Water discharge opening 53 is connected by drain line 55 to a pinch valve 59 which in the preferred embodiment is an air-pressure operated valve of the type suitable for handling fibrous and sandy slurries. A drain line 61 extends from pinch valve 59 to the inlet of slurry pump 63. The outlet end of pump 63 communicates with discharge 65 which is located to direct water and any material entrained therein into hopper 67 having a perforated bottom 69 for screening particulate material, which material may optionally be collected for recycle to furnace F. Alternatively, drain line 61 could be connected to a gravity drain equipped with a filter basket, which could be manually cleaned. A back-flush line 57 is connected to drain line 55 and water is introduced therethrough as indicated to fill the hopper with the water body B and/or to clear opening 53 and/or line 55 of accumulated granular material. Water to form water body B may alternately or in part be introduced into hopper 13 by means of nozzles 40.

In yet another embodiment (FIG. 3) air is introduced into the unit enclosure through louvers 16. This causes melt stream A to be diverted from a vertical fall path to the path designated A'. In this embodiment water curtain 42 is created by water flowing from pipe 76 (which has in it valve 77) across upper surface 75 of hopper 13. Melt stream A' falling against water curtain 42 is converted to cullet C' which is collected as heretofore described. Alternately, a water trough 31 (FIG. 3a) can be installed in surface 75 in area 3a, in which a small body of water 10 is created by water supplied by pipe 33 (which has in it valve 30). The cullet C' formed when melt stream A' hits water body 10 is carried out of trough 31 by water overflow 32 and again collected as described above.

It is desirable to have at least a portion of the walls and bottom of hopper 13 enclosed by water jacket 27, through which cooling water circulates from inlet pipe 29 to outlet pipe 28. This jacket 27 serves to help control temperature of the collected waste and/or cullet and the equipment, and also serves as an emergency cooling means if slagging off should occur when insufficient water is present in hopper 13.

The system of this invention also includes control means and sensing means to cause automatic shifting from the wet cullet collection mode to the dry waste collection mode and back again, depending on the operation of the fiberization system. A sensing device 71 (shown only in FIG. 1) is responsive to the location of rotor unit 12. When the rotors are positioned for fiberization under the melt stream A the sensor causes closure of valve 73 and opening of valve 59 such that any collected water can be drained away from hopper 13 and the unit operated in the dry waste collection mode. When the rotor unit 12 is removed from position under the melt stream A during slagging off, sensor 71 causes opening of the appropriate water inlet valves (valve 30, 38 and/or 77, or valve 73 with simultaneous closure of valve 59) to cause influx of water to hopper 13 through pipe 33, nozzles 40, pipe 76 or opening 53, respectively. If it is desired to accumulate a body of water B valve 59 will also be closed. Sensor 71 will be equipped with manual selector means (not shown) to designate what water influx means (i.e., nozzles 40, trough 31, water curtain 42 and/or water body B) will be selected. At such time as the slagging off ceases and rotor unit 12 is returned to position for fiberization, the sensing unit 71 allows drainage of the hopper 13 through line 55 and valve 59. Means other than position sensor 71 can also be used to determine if fiberization is or is not occurring. For instance, a light beam can be directed below rotor unit 12, such that when unit 12 is moved out of the fiberization position, molten stream A intersects the light beam and causes a resulting signal (as through a photocell) to be generated to cause water introduction to the hopper. Subsequent restoration of the beam when the rotor unit is again in place and intercepting molten stream A causes a second signal to be generated to initiate drainage of the hopper.

While the invention herein has been described in terms of formation of inorganic refractory (predominantly aluminosilicate) fibers and mineral wool fibers, it will be apparent that the process and apparatus are equally applicable to formation of all other types of synthetic inorganic fibers such as glass fibers, slag fibers, rock wool fibers, silica fibers, alumina fibers and other mineral and/or oxide fibers. It may also have applicability in various synthetic organic fiber formation processes, particularly in the wet operation for the recovery of the organic analogue of cullet. In the latter case a liquid other than water, such as an organic solvent, might be the preferred fluid for the liquid body B.

In addition, while the apparatus has been illustrated with the preferred screw conveyor, there are other means of removing waste and/or cullet from the hopper, such as belt conveyors, gravity chutes, bucket conveyors, and so forth. Because of the simplicity and desirability of the screw conveyor and the ability to combine conveyance and dewatering in one unit, the screw conveyor is preferred.

STATEMENT OF INDUSTRIAL APPLICATION

The invention herein is useful in industrial processes to form fibers of inorganic materials such as refractories, glass, slag and the like, as well as in certain processes to form organic fibers.

We claim:

1. A process for the collection of waste or cullet from a fiberizing system in which a melt stream impinges on the outer rim of at least one rapidly spinning rotor, is broken into small drops by such impingement and the drops are attenuated into fibers by being flung from the rim of said at least one rotor, which process comprises:
   (a) positioning a collection hopper below the level of said at least one rotor in said system and disposed to receive waste or cullet from said system;
   (b) providing means to sense whether fiberizing is or is not occurring in said system at a given point in time;
   (c) when fiberizing is occurring, collecting waste from said fiberizing in said hopper while said hopper is substantially dry;
   (d) when fiberizing is not occurring, collecting cullet from said system in said hopper while there is a significant quantity of liquid in contact with said melt stream whereby said cullet is formed; and
   (e) providing means responsive to said sensing means to cause said quantity of liquid to be introduced into said hopper when the non-occurrence of fiberizing is sensed and to cause said hopper to be substantially drained of liquid when the occurrence of fiberizing is sensed.

2. A process as in claim 1 wherein said waste or cullet formed is continuously conveyed away from said hopper.

3. A process as in claims 1 or 2 wherein said collected waste or cullet is subsequently comminuted to a particle size suitable for reclaim and remelting in said fiberizing system.

4. A process as in claim 1 wherein at least a portion of said quantity of water of step (d) accumulates into a body of liquid in said hopper and said cullet is formed by the contact of said melt stream with said body of liquid.

5. A process as in claim 1 wherein said quantity of liquid is introduced into said hopper through spray nozzles and said cullet is formed by the contact of said melt stream with the liquid spray from said spray nozzles.

6. A process as in claim 5 wherein said liquid is also continuously drained from said hopper.

7. A process as in claim 5 wherein at least a portion of said liquid from said nozzles accumulates as a body of liquid in said hopper.

8. A process as in claim 1 wherein said cullet is at least partially drained of liquid prior to its discharge from said hopper.

9. A process as in claim 1 wherein at least a portion of said shot or cullet is reclaimed and returned to said fiberizing system for remelting.

10. A process as in claims 1, 2, 4, 5, 6, 7, 8 or 9 wherein said liquid is water.

11. A process as in claim 10 wherein said melt stream comprises molten oxides of silica and alumina.

12. A process as in claim 10 wherein said melt stream comprises molten glass.

13. Apparatus for the collection of waste or cullet from a fiberizing system in which a melt stream impinges on the outer rim of at least one rapidly spinning rotor, is broken into small drops by such impingement and the drops are attenuated into fibers by being flung from the rim of said at least one rotor, which apparatus comprises:
   (a) a hopper disposed below the level of said at least one rotor in said system and positioned to collect waste or cullet from said system;
   (b) sensing means to sense whether fiberization is or is not occurring in said system;
   (c) flooding means to introduce a significant amount of liquid into said hopper in a manner such that said liquid will contact the melt stream whereby said cullet is formed;
   (d) draining means to drain said hopper substantially free of liquid; and
   (e) means responsive to said sensing means to operate said flooding means when fiberization is not occurring and to operate said draining means when fiberization is occurring.

14. Apparatus as in claim 13 wherein said flooding means comprises a liquid supply pipe opening into said hopper such that liquid introduced through said pipe accumulates as a liquid body in said hopper.

15. Apparatus as in claim 14 further comprising an overflow line from said hopper which controls the depth of said liquid body.

16. Apparatus as in claim 13 wherein said flooding means comprises at least one spray nozzle through which said liquid is introduced into said hopper and which nozzle is disposed such that liquid spray from said nozzle contacts said melt stream and causes said cullet to form from said melt stream.

17. Apparatus as in claim 13 comprising means for forming a small liquid body along a wall of said hopper, which liquid body will be contacted by said melt stream when said melt stream is diverted from vertical flow.

18. Apparatus as in claim 17 comprising a trough wherein said liquid body is formed.

19. Apparatus as in claim 17 comprising means to form a liquid curtain over at least a portion of the surface of said wall.

20. Apparatus as in claim 13 further comprising an extended section of said hopper positioned out of contact with said quantity of liquid and through which said cullet is passed for drainage of liquid.

21. Apparatus as in claim 13 further comprising means for continually conveying collected waste or cullet away from said hopper.

22. Apparatus as in claim 21 wherein said conveying means comprises a screw conveyor.

23. Apparatus as in claim 22 wherein said screw conveyor is inclined at an angle of between 10° and 45° from the horizontal.

24. Apparatus as in claim 23 wherein said inclination is in the range of from 20° to 30° from the horizontal.

25. Apparatus as in claim 24 wherein said inclination is on the order of 23° from the horizontal.

26. Apparatus as in claim 13 further comprising means for comminuting collected waste or cullet into particle sizes suitable for reclaim and recycle to said fiberizing system.

27. Apparatus as in claim 13 wherein said sensing means comprises a position sensor which can detect whether said at least one rotor is in a position in which said melt stream impinges on said rotor.

* * * * *